US012610380B2

(12) United States Patent (10) Patent No.: US 12,610,380 B2
Wang et al. (45) Date of Patent: Apr. 21, 2026

(54) RESOURCE SELECTION METHOD, RESOURCE SELECTION DEVICE AND TERMINAL DEVICE

(71) Applicant: DATANG GOHIGH INTELLIGENT AND CONNECTED TECHNOLOGY (CHONGQING) CO., LTD., Chongqing (CN)

(72) Inventors: Yakun Wang, Beijing (CN); Rui Zhao, Beijing (CN); Chenxin Li, Beijing (CN); Tianjun Shen, Beijing (CN)

(73) Assignee: DATANG GOHIGH INTELLIGENT AND CONNECTED TECHNOLOGY (CHONGQING) CO., LTD., Chongqing (CN)

( * ) Notice: Subject to any disclaimer, the term of this patent is extended or adjusted under 35 U.S.C. 154(b) by 401 days.

(21) Appl. No.: 18/002,653

(22) PCT Filed: Oct. 22, 2021

(86) PCT No.: PCT/CN2021/125899
§ 371 (c)(1),
(2) Date: Dec. 20, 2022

(87) PCT Pub. No.: WO2022/083766
PCT Pub. Date: Apr. 28, 2022

(65) Prior Publication Data
US 2023/0262737 A1 Aug. 17, 2023

(30) Foreign Application Priority Data
Oct. 23, 2020 (CN) .......................... 202011149078.1

(51) Int. Cl.
*H04W 72/04* (2023.01)
*H04W 72/12* (2023.01)
(Continued)

(52) U.S. Cl.
CPC ......... *H04W 72/40* (2023.01); *H04W 72/542* (2023.01); *H04W 72/569* (2023.01)

(58) Field of Classification Search
None
See application file for complete search history.

(56) References Cited

U.S. PATENT DOCUMENTS

2016/0095092 A1* 3/2016 Khoryaev ............. H04W 8/005
370/329
2016/0338098 A1 11/2016 Li et al.
(Continued)

FOREIGN PATENT DOCUMENTS

CN 105917698 A 8/2016
CN 110547024 A 12/2019
(Continued)

OTHER PUBLICATIONS

Extended European Search Report for the corresponding European Patent Application No. 21882178 issued by the European Patent Office on Feb. 29, 2024.
Japanese Office Action for the corresponding Japanese Patent Application No. 2022-578883, mailed Sep. 19, 2023.
International Search Report for PCT Application PCT/CN2021/125899 issued on Dec. 29, 2021, and its English Translation provided by WIPO.
(Continued)

*Primary Examiner* — Sai Aung
(74) *Attorney, Agent, or Firm* — Ladas & Parry, LLP

(57) ABSTRACT
A resource selection method, a resource selection device and a terminal device are provided, related to the field of communications technologies. The method includes: transmitting sidelink resource coordination request information; receiving sidelink resource coordination information from a coordinating UE; and performing a resource selection for the sidelink, according to the sidelink resource coordination information.

20 Claims, 4 Drawing Sheets

(51) Int. Cl.
| | |
|---|---|
| *H04W 72/40* | (2023.01) |
| *H04W 72/542* | (2023.01) |
| *H04W 72/566* | (2023.01) |

(56) References Cited

U.S. PATENT DOCUMENTS

| | | | | |
|---|---|---|---|---|
| 2018/0332585 | A1 | 11/2018 | Faurie et al. | |
| 2019/0159174 | A1* | 5/2019 | Seo | H04W 76/14 |
| 2020/0128566 | A1 | 4/2020 | Wei et al. | |
| 2020/0220694 | A1 | 7/2020 | Khoryaev | |
| 2020/0296738 | A1 | 9/2020 | Inokuchi et al. | |
| 2020/0396734 | A1* | 12/2020 | Li | H04W 56/0005 |
| 2021/0014831 | A1* | 1/2021 | Ryu | H04W 72/02 |
| 2021/0028891 | A1* | 1/2021 | Zhou | H04W 4/40 |
| 2022/0174695 | A1* | 6/2022 | Lee | H04L 1/1864 |
| 2023/0164814 | A1* | 5/2023 | Miao | H04W 74/0808 |
| | | | | 370/329 |

FOREIGN PATENT DOCUMENTS

| | | | |
|---|---|---|---|
| CN | 110582121 A | 12/2019 | |
| CN | 110972316 A | 4/2020 | |
| CN | 112291743 A | 1/2021 | |
| EP | 3641460 A1 | 4/2020 | |
| WO | 2017163545 A1 | 9/2017 | |

OTHER PUBLICATIONS

Written Opinion for PCT Application PCT/CN2021/125899 issued on Dec. 29, 2021, and its English Translation provided by WIPO.

Internationally Preliminary Report on Patentability for PCT/CN2021/125899 issued on Apr. 13, 2023, and English translation provided by WIPO.

"Discussion on Inter-UE Coordination for Mode 2 Resource Allocation," 3GPP TSG RAN WG1 #103-e, R1-2008447, e-Meeting, Oct. 26-Nov. 13, 2020, Agenda Item: 8.11.2.2, Source: Apple, all pages.

First Office Action and search report for corresponding Chinese Patent Application No. 202011149078.1 issued on Jan. 4, 2021 and its English translation provided by foreign associate.

"Feasibiliy and benefits of mode 2 enhancements for inter-UE coordination," 3GPP TSG-RAN WG1 Meeting #102-e R1-2006445, e-Meeting, Aug. 17-28, 2020, Agenda Item: 8.11.2.2, Source: Ericsson, all pages.

Office action from corresponding South Korean Patent Application No. 10-2022-7045253 dated Apr. 3, 2025.

Spreadtrum Communications, R1-2006268, "Discussion on feasibility and benefit of mode 2 enhancements," 3GPP TSG RAN WG1 #102-E, e-Meeting, Aug. 17-28, 2020, 3GPP server publication date (Aug. 8, 2020).

\* cited by examiner

RESOURCE SELECTION METHOD, RESOURCE SELECTION DEVICE AND TERMINAL DEVICE

CROSS-REFERENCE TO RELATED APPLICATIONS

The present application is the U.S. national phase of PCT Application PCT/CN2021/125899 filed on Oct. 22, 2021, which claims a priority of Chinese patent application No. 202011149078.1 filed on Oct. 23, 2020, the disclosures of which are incorporated in their entireties by reference herein.

TECHNICAL FIELD

The present disclosure relates to the field of communications technologies, and in particular, to a resource selection method, a resource selection device and a terminal device.

BACKGROUND

In the Release 16 (Rel-16) NR-V2X Mode 2 resource allocation mechanism, a User Equipment (UE) resource selection process is as follows:

A) the UE excludes the reserved resources, which are located in the resource selection window and Reference Signal Receiving Power (RSRP) of a Physical Sidelink Shared Channel (PSSCH) is greater than an RSRP threshold, from the resource selection window according to the sensing result; the RSRP threshold is determined according to the priority of the received packet and the priority of the packet to be transmitted;

B) judging the proportion of available resources after resource exclusion. If the proportion of the available resource is less than X% of the total number of the resources in the resource selection window, the RSRP threshold is increased by 3 dB, and the resource exclusion process in the step A) is repeated until the proportion of the available resource is greater than or equal to X%;

C) the UE randomly selects transmission resource from the available resources.

However, the above resource allocation mechanism has half duplex issue, hidden node issue, etc.; in order to solve these issues, the industry proposes to use Inter-UE Coordination mechanism for resource allocation, and for the Inter-UE Coordination mechanism, the related scheme is:

triggering coordination information transmission based on a request signaling, where the request signaling includes: sub-channel information, RSRP threshold and priority information of packet; after receiving the coordination request information, the coordinating UE may determine valid coordination information according to information in the coordination request information.

Certainly, the coordination request information may further include a time-frequency resource selected by the coordinated UE, and after the coordinating UE decodes the coordination request information, according to its own sensing result, that is: judging whether the resource selected by the coordinated UE is appropriate or not from the perspective of the coordinating UE, if not, feeding back 1-bit information for identifying whether the resource selected by the coordinated UE is appropriate or not (assuming that '0' represents inappropriate and '1' represents appropriate), and if the coordinated UE receives '0', triggering the coordinated UE to reselect the resource.

However, the related schemes still have the problems that, due to the problems of hidden node and half-duplex, resources selected by the coordinated UE are not necessarily appropriate, so that the coordinating UE cannot decode correctly, the overhead of the coordination request information is uncertain, the container of the coordination request information is uncertain, and the overhead of the coordination information is too large and the timeliness is poor.

SUMMARY

The embodiment of the disclosure provides a resource selection method, a resource selection device and a terminal device, which solves the problems of high coordination information overhead, poor timeliness of coordination information and uncertain coordination request information container in a resource allocation mechanism.

In a first aspect, an embodiment of the present disclosure provides a resource selection method, applied to a coordinated user equipment (UE) of a Vehicle to everything (V2X) sidelink system and including:

transmitting sidelink resource coordination request information;

receiving sidelink resource coordination information from a coordinating UE; and performing a resource selection for the sidelink, according to the sidelink resource coordination information.

In a second aspect, an embodiment of the present disclosure provides a terminal device including a transceiver, a memory, a processor and a computer program stored on the memory and executable on the processor, where the processor is configured to execute the computer program to perform the resource selection method according to the first aspect.

In a third aspect, an embodiment of the present disclosure provides a resource selection device, applied to a coordinated user equipment (UE) of a Vehicle to everything (V2X) sidelink system and including:

a transmission module, configured to transmit sidelink resource coordination request information;

a receiving module, configured to receive sidelink resource coordination information from a coordinating UE; and a selecting module, configured to select a resource for the sidelink according to the sidelink resource coordination information.

In a fourth aspect, the disclosed embodiments provide a computer-readable storage medium, storing a computer program, where the computer program is executed by a processor to perform the resource selection method according to the first aspect.

The beneficial effect of the present disclosure is:

when a coordinated UE of a V2X sidelink system selects resource, the coordinated UE firstly transmits sidelink resource coordination request information, then receives sidelink resource coordination information transmitted by a coordinating UE, and finally selects the resource of the sidelink according to the sidelink resource coordination information. Therefore, on one hand, the overhead of the sidelink resource coordination request information is determined, so as to determine conveniently a container of the sidelink resource coordination request information; on the other hand, the timeliness of the sidelink resource coordination information determined by the coordinating UE according to the sidelink resource coordination request information is better, thereby avoiding the large signaling overhead of the sidelink resource coordination information due to the unnecessary transmission of the sidelink resource coordination information.

DETAILED DESCRIPTION

To make the technical problems, technical solutions and advantages to be solved by the present disclosure clearer, the following detailed description is made with reference to the accompanying drawings and specific embodiments. In the following description, specific details are provided, such as specific configurations and components, merely to facilitate a thorough understanding of embodiments of the disclosure. Accordingly, it will be apparent to those skilled in the art that various changes and modifications can be made to the embodiments described herein without departing from the scope and spirit of the disclosure. In addition, descriptions of well-known functions and constructions are omitted for clarity and conciseness.

It should be appreciated that reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "according to an embodiment" in various places throughout this specification are not necessarily all referring to the same embodiment. Furthermore, the particular features, structures, or characteristics may be combined in any suitable manner in one or more embodiments.

In various embodiments of the present disclosure, it should be understood that the sequence numbers of the following processes do not mean the execution sequence, and the execution sequence of each process should be determined by the function and the inherent logic thereof, and should not constitute any limitation to the implementation process of the embodiments of the present disclosure.

In the embodiments provided in the present disclosure, it should be understood that "B corresponding to A" means that B is associated with A from which B can be determined. It should also be understood that determining B from A does not mean determining B from A alone, but may also be determined from A and/or other information.

In the embodiment of the present disclosure, the terminal device may be a mobile phone (or a mobile phone), or other devices capable of transmitting or receiving wireless signals, including a user Equipment, a Personal Digital Assistant (PDA), a wireless modem, a wireless communication device, a handheld device, a laptop computer, a cordless phone, a Wireless Local Loop (WLL) station, a Customer Premises Equipment (CPE) or a mobile smart hotspot capable of converting mobile signals into WiFi signals, a smart appliance, or other devices capable of autonomously communicating with a mobile communication network without human operation, and the like.

Figure 1:
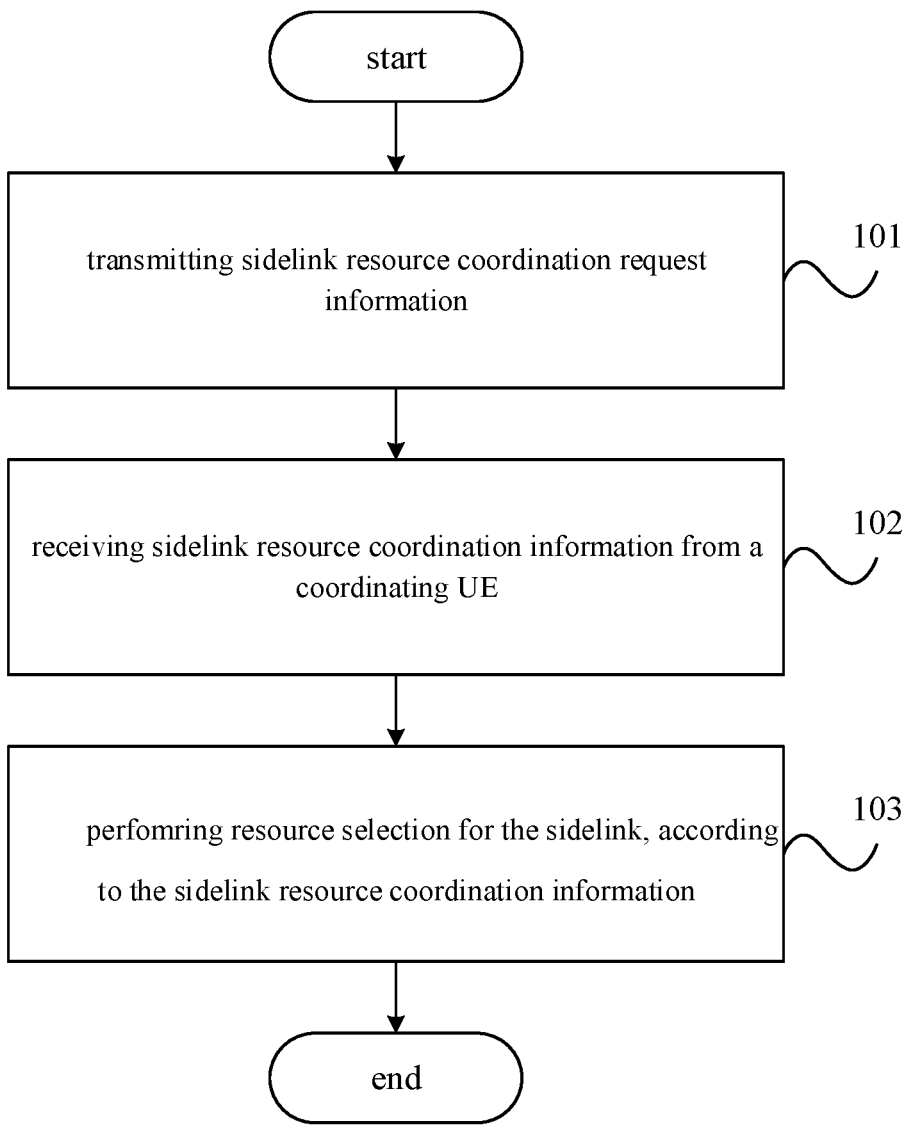
FIG. 1 is a flow chart of a resource selection method according to an embodiment of the present disclosure.
Figure 2:
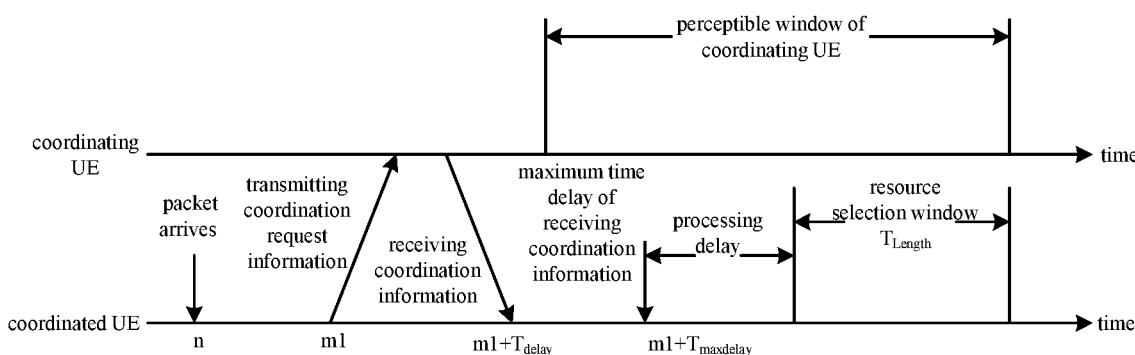
FIG. 2 is a first timing diagram of cooperative interaction between UEs according to an embodiment of the present disclosure.

As shown in FIG. 1, an embodiment of the present disclosure provides a resource selection method, applied to a coordinated user equipment (UE) of a Vehicle to everything (V2X) sidelink system and including:

Step 101: transmitting sidelink resource coordination request information;

as shown in FIG. 2, before transmitting the sidelink resource coordination request information, the higher layer of the coordinated UE firstly transmits the packet to be transmitted to the physical layer of the coordinated UE, that is: in FIG. 2, a packet to be transmitted arrives at the physical layer of the coordinated UE at time n; the coordinated UE then transmits the sidelink resource coordination request information to the coordinating UE at time m1;

Step 102: receiving sidelink resource coordination information from a coordinating UE;

as shown in FIG. 2, the step 102 specifically includes receiving at time $m1+T_{delay}$ the sidelink resource coordination information transmitted by the coordinating UE; it should be noted that the sidelink resource coordination information is sidelink resource coordination information determined by the coordinating UE according to the sidelink resource coordination request information. Therefore, the overhead of the sidelink resource coordination information is not overlarge, and the timeliness is better.

Step 103: performing a resource selection for the sidelink, according to the sidelink resource coordination information.

According to the resource selection method of the embodiment of the disclosure, when a coordinated UE of a V2X sidelink system selects resource, the coordinated UE firstly transmits sidelink resource coordination request information, then receives sidelink resource coordination information transmitted by a coordinating UE, and finally selects the resource of the sidelink according to the sidelink resource coordination information. Therefore, on one hand, the overhead of the sidelink resource coordination request information is determined, so as to determine conveniently a container of the sidelink resource coordination request information; on the other hand, the timeliness of the sidelink resource coordination information determined by the coordinating UE according to the sidelink resource coordination request information is better, thereby avoiding the large signaling overhead of the sidelink resource coordination information due to the unnecessary transmission of the sidelink resource coordination information.

In an embodiment, the sidelink resource coordination request information includes at least one of:

indication information of coordinating information type;

indication information of a maximum time delay of coordinating information feedback;

indication information of a target resource selection window of resource coordination;

a transmission parameter of packet of the coordinated UE;

Reference Signal Receiving Power (RSRP) threshold indication information;

indication information of coordinating information transmission parameter; or indication information of the coordinating UE.

Here, it should be noted that, the indication information of coordinating information type may be used to indicate a type of coordination indication resource in the sidelink resource coordination information that is expected to be transmitted by the coordinating UE, and the type may be: available time-domain resource, available time-frequency resource, unavailable time-domain resource or unavailable time-frequency resource, etc.; the indication information of a maximum time delay of coordinating information feedback may be used to indicate the latest time for receiving the sidelink resource coordination information transmitted by the coordinating UE, i.e., the sidelink resource coordination information received before the maximum time delay of the coordination information feedback is valid, so that the timeliness of the sidelink resource coordination information can be better; indication information of a target resource selection window of resource coordination is used for indicating that the coordinating UE is expected to select the coordination indication resource in the target resource selection window of the resource coordination; a service packet transmission parameter of the coordinated UE is used to represent the parameter used by the coordinated UE for transmitting the packet, and the packet transmission parameters of the coordinated UE is included in the sidelink resource coordination request signaling, so that the coordinating UE can select resources according to the parameters to exclude the unqualified resource, thereby reducing the unnecessary overhead of the sidelink resource coordination information; the RSRP threshold indication information is used for indicating the adjustment requirement of the RSRP threshold used in the resource selection procedure of coordinating UE, which is expected by the coordinated UE; the indication information of coordinating information transmission parameter(s) is used for indicating a transmission mode of sidelink resource coordination information of the coordinating UE which is expected by the coordinated UE; the indication information of the coordinated UE is used to indicate the valid coordinating UE(s), and may be: coordinating UE list, where the UEs in the coordinating UE list are valid coordinating UEs.

In an embodiment, the transmission parameter of packet of the coordinated UE include at least one of:

a number of sub-channels occupied by a packet to be transmitted by the coordinated UE;

a number of times of retransmission of a packet to be transmitted by the coordinated UE;

a transmission period of a packet to be transmitted by the coordinated UE;

a current Counter value of a packet to be transmitted by the coordinated UE;

a priority of a packet to be transmitted by the coordinated UE; or a target resource selection window parameter of the coordinated UE.

Here, it should be noted that the coordinating UE may determine the granularity of the available resource or the unavailable resource in the sidelink resource coordination request information according to a number of sub-channels occupied by a packet to be transmitted by the coordinated UE, so as to reduce the overhead of the sidelink resource coordination request information, for example: the coordinated UE transmission resource needs to occupy two consecutive sub-channels, and the coordinating UE perceives that only one sub-channel is available in a certain slot, and although the resource is not occupied, the resource is not applicable to the coordinated UE, so that the resource is not included in the sidelink resource coordination information.

The coordinating UE may adjust the proportion of the available resource or the unavailable resource in the coordination information according to the number of times of retransmission of the packet to be transmitted by the coordinated UE.

The transmission period of the packet to be transmitted by the coordinated UE and the current Counter value of the packet to be transmitted by the coordinated UE may be used to determine a length of the resource indication window in the sidelink resource coordination information or the transmission period and/or the transmitting times of the sidelink resource coordination information.

The priority of the packet to be transmitted by the coordinated UE may be used to: if the resource type in the coordination information signaling is the not recommended resource, the coordinating UE may exclude the resource occupied by the UE with higher priority than the priority from the candidate resource when determining the available resource, that is: the resource occupation information may be included in the sidelink resource coordination information, and when the coordinated UE receives the sidelink resource coordination information to perform resource selection, the resource occupied by the higher priority UE should be avoided, so as to ensure the higher priority performance.

The target resource selection window parameter of the coordinated UE is used to indicate a resource selection window predefined by the coordinated UE, that is, whenever the coordinated UE receives the sidelink resource coordination information, the resource selection window of the coordinated UE is within the range indicated by the target resource selection window indication information of the resource coordination, so that the coordinating UE only needs to transmit the resource before the end time of the time duration indicated by the target resource selection window indication information of the resource coordination. It should be noted that the end time of the time duration indicated by the target resource selection window indication information may be a Remaining Packet Delay Budget (Remaining PDB), that is, the latest transmission time of the packet.

Certainly, the sidelink resource coordination request information of the embodiment of the present disclosure may further include the selected resource of the coordinated UE, after the coordinating UE decodes the coordination request information, the coordinating UE determines whether the resource selected by the coordinated UE is appropriate or not from the perspective of the coordinating UE according to the self sensing result, and if the resource selected by the coordinated UE is not appropriate, 1-bit information may be fed back to identify whether the resource selected by the coordinated UE is appropriate or not (it is assumed that "0" indicates inappropriate, and "1" indicates appropriate); if the coordinated UE receives "0", the coordinated UE may be triggered to perform the resource reselection.

In an embodiment, the indication information of coordinating information type includes:

an available time-frequency resource; or an available time-domain resource; or an unavailable time-frequency resource; or an unavailable time-domain resource.

In this optional embodiment, the coordination information type indication is used to identify a type of coordination information that the coordinated UE expects the coordinating UE to transmit.

Figure 3:
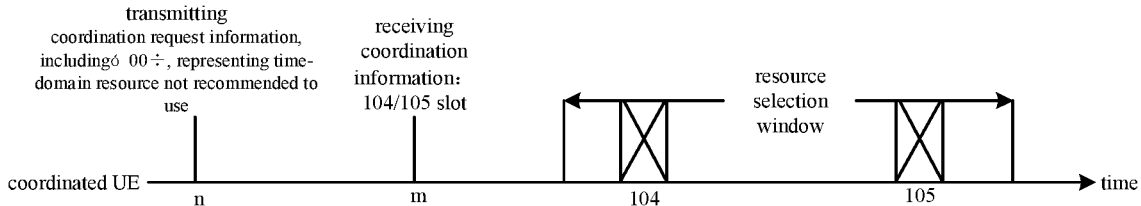
FIG. 3 is a schematic view illustrating that a timing resource not recommended is excluded through a cooperation between UEs according to an embodiment of the present disclosure.

As another specific example, as shown in FIG. 3, the coordination request information transmitted by the coordinated UE includes a coordination information type indication (type of the expected coordination information), and respectively indicates, through 1-bit information, "whether the coordination information expected to be transmitted is an available resource (resource proposed to be used) or an unavailable resource (resource not proposed to be used)", and the 1-bit information indicates "whether the coordination information expected to be transmitted is a time-domain resource or a time-frequency resource (time-domain+frequency domain resource)". For example, in order to solve the half-duplex problem, the bit corresponding to the type indication of the coordination information should be "00", which indicates "time-domain resource not recommended to use", the coordinating UE may perform a sensing after receiving the coordination request information, and finds that the coordinating UE will transmit the packet at 104 slot and 105 slot as shown in FIG. 3, where the coordinating UE cannot receive data due to the half-duplex effect. Therefore, the time-domain resource included in the coordination information signaling are: 104 slots, 105 slots. When the coordinated UE receives the coordination information signaling, the resource on the corresponding slots are excluded from the candidate resources, and when the transmission resource is selected, the resources on the corresponding slots are not selected.

Optionally, the indication information of the maximum time delay of coordinating information feedback includes one of:

a time delay threshold, configured to indicate a maximum time delay between receiving the sidelink resource coordination information and transmitting the sidelink resource coordination request information;

a first offset time, configured to indicate a offset between a time of transmitting the sidelink resource coordination request information and a time when the packet to be transmitted arrives a physical layer of the coordinated UE.

Here, it should be noted that the time delay information is used to indicate that the coordination information signaling received before the time corresponding to the time delay information is a valid coordination information signaling, so as to ensure timeliness of the coordination information signaling. That is, the time delay information is used to indicate the latest time of receiving coordination information signaling.

Figure 4:
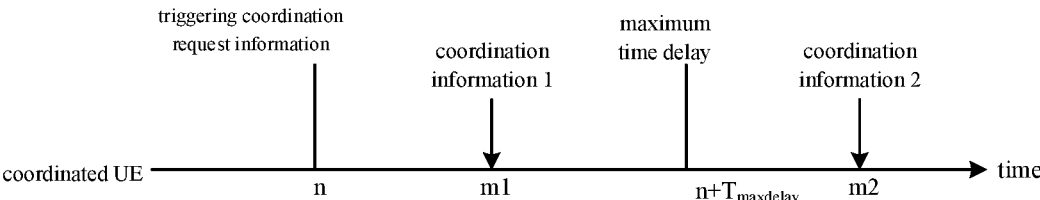
FIG. 4 is a schematic view illustrating a timeliness of sidelink resource coordination information according to an embodiment of the disclosure.

The time delay information is specifically described below with reference to FIG. 4, and as shown in FIG. 4, the coordination request information is triggered at n, and the maximum time delay of receiving the coordination information configured by a higher layer is $T_{maxdelay}$. It is considered that the coordination information signaling is valid if the coordination information signaling is received at a time m1 (m1<=n+$T_{maxdelay}$); if the coordination information signaling is received at time m2 (m2>n+$T_{maxdelay}$), the coordination information is considered as invalid.

Specifically, the time delay information may be a value configured by a higher layer, such as the aforementioned time delay threshold, where the value is a maximum time delay for receiving the coordination information signaling relative to transmitting the coordination request information, that is, the coordination information signaling is received as a valid signaling within the time delay threshold after the time of transmitting the coordination request information; namely: the coordinating UE can determine the latest time for transmitting the coordination information signaling according to the time for transmitting the coordination request information and the time delay threshold.

Of course, the time delay information may be absolute time, such as: receiving a latest time of the coordination information signaling; that is, the coordination request information may include an indication of the latest absolute time to receive the coordination information signaling.

The time delay information may also be relative time, such as: the first offset time is used for indicating an offset between a time of transmitting the sidelink resource coordination request information and a time when the packet to be transmitted arrives a physical layer of the coordinated UE.

It should be noted that, when the time delay information is the first offset time, the coordinating UE may determine, according to the transmitting time of the coordination request information and the first offset time, the time when the packet to be transmitted reaches the physical layer of the coordinated UE, so as to implicitly obtain the maximum time delay (relative to the time when the packet to be transmitted arrives or relative to the time when the coordination request information is transmitted) when the coordinated UE receives the coordination information signaling according to the priority of the packet to be transmitted carried in the coordination request information.

Optionally, the indication information of the target resource selection window of resource coordination includes any one of:

a start time and an end time of a target resource selection window of the coordinated UE;

an end time of a target resource selection window of the coordinated UE.

It should be noted that, by setting the target resource selection window indication information for resource coordination in the sidelink resource coordination request information, the time limitation on the sidelink resource coordination information is realized, so that the coordination indication resource selected by the coordinating UE is at least located before the end time of the target resource selection window for resource coordination, thereby reducing the overhead of the sidelink resource coordination information and ensuring that the sidelink resource coordination information is more targeted.

Specifically, the target resource selection window indication information of the resource coordination may be indicated explicitly as the latest time of the start time and the latest time of the end time of the target resource selection window; as shown in FIG. 2, the latest time of the start time of the resource selection window may be m1+$T_{maxdelay}$+ processing delay, where m1 represents a time of transmitting the sidelink resource coordination request signaling, and $T_{maxdelay}$ represents indication information of a maximum time delay of coordination information feedback in the sidelink resource coordination request information.

The resource selection window parameter may be the latest time of the end time of the resource selection window and the length of the resource selection window ($T_{length}$), and the coordinating UE may obtain the latest time of the start time of the resource selection window (the latest time of the end time of the resource selection window$-T_{length}$) according to the latest time of the end time of the resource selection window and the length of the resource selection window.

The resource selection window parameter may also be the latest time of the resource selection window start time and the resource selection window length $T_{length}$, and the coordinating UE may obtain the latest time of the resource selection window end time (the latest time of the resource selection window start time+the resource selection window length $T_{length}$) according to the latest time of the resource selection window start time and the resource selection window length $T_{length}$.

Of course, the indication information of the target resource selection window of resource coordination may also only include the end time of the target resource selection window, in this case, the coordinating UE may determine that the resource required by the coordinated UE is a resource before the end time, so that the coordinating UE may automatically determine the start time of the resource indication window according to the pre-configuration rule to determine the resource indication window, and determine the valid coordination information in the determined resource indication window.

Of course, the indication information of the target resource selection window of resource coordination may also be the latest time of the starting time of the target resource selection window, so that the coordinating UE may determine the latest time of the end time of the resource indication window (the latest time of the starting time of the resource selection window+the first preconfigured value) according to the first preconfigured value;

of course, the indication information of the target resource selection window of resource coordination may also be only the target resource selection window start time, so that the coordinating UE may determine the end time of the resource indication window (the resource selection window start time+the second preconfigured value) according to the second preconfigured value.

The indication information of the target resource selection window of resource coordination may also be a second offset time, which is used to indicate an offset of the latest time of the start of the target resource selection window relative to the time of transmitting the sidelink resource coordination request information; thus, the coordinated UE may obtain the latest time of the start time of the resource indication window (the time of transmitting the sidelink resource coordination request information+the second offset time) according to the time of transmitting the sidelink resource coordination request information and the second offset time, and then determine the latest time of the end time of the resource indication window (the time of transmitting the coordination request information+the second offset time+the preconfigured value) according to the preconfigured value;

the indication information of the target resource selection window of resource coordination may also be the latest time of the time of transmitting the packet to be transmitted.

Optionally, in case that the indication information of the target resource selection window of resource coordination only includes the end time of the target resource selection window of the coordinated UE, the received coordination information of the sidelink includes the start time of the resource selection window sensed by the coordinating UE.

That is to say, if the coordinated UE only indicates the ending time of the target resource selection window, the coordinated UE determines that the coordination information that the coordinated UE wants is the resource occupation information before the time, and the coordinated UE may determine the starting time according to its own sensing, and when transmitting the sidelink coordination information, transmit the sensed starting time to the coordinated UE, so that the coordinated UE can know the starting time.

Optionally, the performing the resource selection for the sidelink according to the sidelink resource coordination information includes:

determining a resource selection window of the coordinated UE, where the resource selection window of the coordinated UE is at least part of a resource indication window contained in the sidelink resource coordination information; and performing the resource selection for the sidelink in the resource selection window of the coordinated UE.

Here, it should be noted that, if the target resource selection window indication information for resource coordination in the sidelink resource coordination request information includes a start time and an end time, such as: k1, k2, the coordinating UE feeds back coordination information in the time duration of [k1, k2], and the coordinated UE may select the resource selection window at the time duration of [k1, k2] or a subset of [k1, k2] when determining the resource selection window. If the indication information of the target resource selection window of resource coordination in the sidelink resource coordination request information includes the end time, the coordinating UE transmits the start time sensed by the coordinating UE to the coordinated UE so that the coordinated UE determines the resource selection window according to the start time sensed by the coordinating UE and the end time included in the indication information of the target resource selection window; specifically, the resource selection window may be a part or all of a window determined by a start time sensed by the coordinating UE and the end time included in the indication information of the target resource selection window.

The resource selection of the sidelink in the resource selection window of the coordinated UE may specifically be:

the coordinated UE determines the resource occupation condition within the resource selection window according to the sensing result, to determine an available resource set SA;

determining the latest available resource SA' according to the fed-back sidelink resource coordination information, which includes the following cases:

if the coordination information contains unavailable time-domain resource information: if all the resource on the corresponding unavailable time-domain are in the SA, excluding the corresponding resource from the SA, where the set after exclusion is SA';

if the coordination information contains unavailable time-frequency resource information: if the unavailable time-frequency resource is in the SA, the unavailable time-frequency resource needs to be excluded from the SA, and the excluded set is SA';

if the coordination information contains available time-frequency resource information: SA' is the intersection or union of the SA and the available time-frequency resource information contained in the coordination information;

if the coordination information includes available time-domain resource information: SA' is the intersection or union of the SA and all resource on the available time-domain contained in the coordination information.

Randomly selecting resource required by transmission from an available resource set SA' obtained according to the self-sensed information and the coordination information.

Optionally, the coordination information transmission parameter indication information includes any one of:

a transmission period;

a transmission period and a number of times of transmission.

Here, it should be noted that the coordination information transmission parameter indication information may be a transmission method in which the coordinated UE desires to coordinate the UE to transmit the sidelink resource coordination information, such as: transmission periodically; of course, in the case of periodic transmission, the number of times of transmission of the periodic transmission may be further indicated. Of course, if the coordinated UE does not desire the periodic transmission of the sidelink coordination information from the coordinating, the sidelink resource coordination request information may not include the coordination information signaling transmission parameter, or the coordination information transmission parameter indication information is null.

In an embodiment, the indication information of coordinating information transmission parameter is configured by a higher layer or preconfigured; or when a traffic of the coordinated UE is a periodic traffic, the transmission period is a transmission period of a packet to be transmitted by the coordinated UE, and the number of times of transmission is a current Counter value of a packet to be transmitted by the coordinated UE.

That is, the coordination information signaling parameters may be obtained by the physical layer of the coordinated UE from a higher layer, or, pre-configured; or, by periodic traffic of the coordinated UEs.

Here, it should be noted that the Counter value is the number that a periodic packet continuously occupies a certain resource in the New Radio-Vehicle to everything mode 2 (NR-V2X mode 2) resource allocation, and when the counter value is 0, the coordinated UE may be triggered to perform resource reselection.

Figure 5:
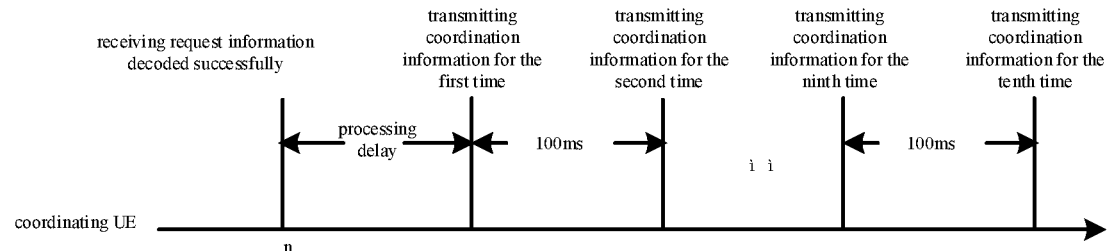
FIG. 5 is a schematic view of periodically transmitting sidelink resource coordination information according to an embodiment of the present disclosure.

Specifically, if the coordinated UE transmitting the sidelink resource coordination request information is a periodic traffic, the service period is 100 ms, the current counter value is 10, and when the coordinated UE transmits the coordination request information, the coordinated UE marks the coordination information signaling transmission parameter as the sidelink resource coordination information signaling transmission period is 100 ms, and the number of times of transmission the coordination information signaling is 10. When the coordinating UE successfully decodes the request information, the coordinating UE continuously transmits the signaling of the coordinating message 10 times at a period of 100 ms as shown in FIG. 5.

Optionally, the RSRP threshold indication information includes any of:

a maximum value of RSRP threshold;

a maximum value of adjusting times of RSRP threshold.

It should be noted that the RSRP threshold configuration information may be configured by a higher layer.

Specifically, the RSRP threshold indication information may be used to adjust the RPRP threshold by the coordinating UE according to the RSRP threshold indication information in the process of determining the coordination information during resource exclusion by the coordinating UE, so that the determined available resource ratio is greater than or equal to the preset ratio of the total number of resource in the resource selection window. The final RSRP threshold after the RSRP threshold is adjusted should not be greater than the maximum value of the RSRP threshold, or the number of times of adjusting the RSRP threshold should not be greater than the maximum value of the RSRP threshold adjustment number of times.

In addition, the sidelink resource coordination request information may further include a priority of a packet to be transmitted by the coordinated UE, so that the coordinated UE may determine, according to the priority of the packet to be transmitted, the RSRP threshold expected by the coordinated UE, specifically, the RSRP threshold corresponding to the priority of the packet to be transmitted may be obtained through a pre-configured RSRP threshold-packet priority correspondence, that is, the RSRP threshold may be implicitly determined through the priority of the packet to be transmitted.

Here, taking the case that the coordination request information includes indication information of coordinating information type, indication information of maximum time delay fed back by coordination information, and RSRP threshold indication information, and the transmission parameter of packet of the coordinated UE includes the number of sub-channels occupied by the packet to be transmitted by the coordinated UE as an example, a coordination process between the coordinated UE and the coordinating UE is described:

Step 1: coordinated UE transmits coordination request information at n time, where the coordination request information includes sub-channel number information, such as: the packet to be transmitted occupies two sub-channels, the RSRP threshold, the coordination information type indication is '11' (representing the time-frequency resource information suggested to be used), and the maximum time delay for receiving the coordination information is 3 ms.

Step 2: when not considering the transmission delay, the coordinating UE receives the coordination request information at the time n. And according to the RSRP threshold in the coordination request information, eliminating occupied resource in the resource selection window, and determining all available resource. And according to the number information of the sub-channels, excluding the available resource which are not occupied by only one continuous sub-channel, thereby determining all available resource information suitable for being used by the coordinated UE.

Step 3: the coordinated UE transmits the sidelink resource coordination information in n+1 ms, and the coordinated UE receives the coordination information signaling in n+1 ms when not considering the transmission delay.

In an embodiment, the step 101 of transmitting the sidelink resource coordination request information includes:

determining a maximum time delay of transmitting the sidelink resource coordination request information, where the maximum time delay of transmitting the sidelink resource coordination request information is configured by a higher layer or preconfigured, or is determined according to a determined maximum time delay between a time of receiving the sidelink resource coordination information and a time when a packet to be transmitted arrives a physical layer of the coordinated UE;

transmitting the sidelink resource coordination request information within the determined maximum time delay of transmitting the sidelink resource coordination request information.

Here, it should be noted that, since the coordination request information is transmitted from the higher layer of the coordinated UE to the physical layer, in this step, the arrival of the coordination request information at the physical layer of the coordinated UE may refer to the time at which the coordination request information transmitted from the higher layer of the coordinated UE to the physical layer arrives at the physical layer. That is, the physical layer of the coordinated UE needs to transmit the coordination request information to the coordinating UE within a preset time delay from the time when the coordination request information transmitted by the higher layer is received. Therefore, the time for coordinating the request information can be ensured not to be too late, so that the time for receiving the coordination information signaling is prevented not to exceed the maximum time delay, the timeliness of the coordination information signaling is ensured, and finally the received coordination information signaling is prevented from being invalid.

Figure 6:
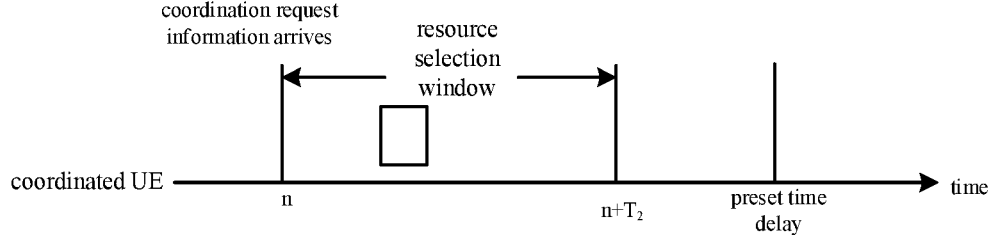
FIG. 6 is a schematic view of a maximum time delay and a resource selection window for transmitting sidelink resource coordination request information according to an embodiment of the present disclosure.

Specifically, when the coordinated UE selects a resource for the coordination request information, a preset time delay is defined, which indicates a maximum value of the end time of the resource selection window relative to the arrival time of the coordination request information. As shown in FIG. 6, when the coordinated UE performs resource selection for the coordination request information, T2<=preset time delay in the resource selection window, and a specific value of T2 depends on a specific implementation of the coordinated UE. The coordinated UE randomly selects the resource required for transmitting the coordination request information within the resource selection window as shown in FIG. 6 according to the sensing result. It should be noted that, the "box" in the resource selection window of FIG. 6 is the resource selected for transmitting the coordination request information.

Optionally, a priority of the sidelink resource coordination request information is one of:

a priority of a packet to be transmitted;

a priority configured by a higher layer or preconfigured; or a preset priority, where the preset priority is a larger one of a first difference and 0, the first difference is a difference between a priority of a packet to be transmitted and a preset value, and the preset value is configured by a higher layer.

It should be noted that, according to the design of the current first-stage sidelink Control Information (1st-stage Sidelink Control Information, 1st-stage SCI), 3 bits may be used in the 1st-stage SCI to represent priority information, and the priority information may be understood as the priority information of the coordination request information; the priority information in the 1st-stage SCI may be written according to one of the priority of the packet to be transmitted, the priority configured by the higher layer, the pre-configured priority, and the pre-set priority.

Specifically, the priority of the packet to be transmitted is: the priority of the packet to be transmitted currently arriving at the physical layer of the coordinated UE, the priority configured by the higher layer is as follows: the physical layer of the coordinated UE receives the priority of the coordination request information transmitted by the higher layer; the preset priority is as follows: the priority is determined according to a comparison between a first difference between a packet to be transmitted and a preset value configured by a higher layer and 0, where it should be noted that, in this optional embodiment, a priority indicated by "0" is the highest priority, and by comparing the first difference with "0", it is to avoid a situation that the first difference is a negative number and the like, which does not meet a preset rule. In other words, the preset priority is a preset value that ensures that the priority of the coordination request information is higher than the priority of the packet to be transmitted. The pre-configured priority may be the highest priority.

Optionally, the sidelink resource coordination request information is carried in one of:

second stage sidelink control information (2nd-stage SCI);

a radio resource control (RRC) signaling;

a media access control control unit (MAC CE).

That is to say, in this optional embodiment, the coordination request information may be carried in the 2nd-stage SCI, RRC signaling, or MAC CE.

In an embodiment, when the 2nd-stage SCI carries the sidelink resource coordination request information, a bit in a first stage sidelink control information (1st-stage SCI) for indicating a format of the 2nd-stage SCI is "10" or "11".

Specifically, the 1st-stage SCI has 2 bit information indicating the format (format) of the 2nd-stage SCI, and currently "00" and "01" are used to indicate the associated "SCI format-A" and "SCI format-B", respectively, so that the present embodiment may define a new 2nd-stage SCI format for transmitting the coordination request information. According to the current design of 1st-stage SCI, there is 2 bit to indicate the format of 2nd-stage SCI, therefore, either "10" or "11" can be used to indicate the new format of 2nd-stage SCI for carrying the coordination request information.

Optionally, the indication information of the coordinating UE includes identification information of one or more target coordinating UEs.

If the sidelink resource coordination request information is transmitted in a broadcast or multicast manner, the indication information of the coordinated UE includes the ID of one or more target coordinated UEs; if the sidelink resource coordination request information is transmitted in a unicast manner, the indication information of the coordinating UE may be null.

When the sidelink resource coordination request information is transmitted in a broadcast or multicast manner, there may be more than one UEs receiving the coordination request information, in order to determine whether the UE is a valid UE after receiving the coordination request information, in this optional embodiment, in the case that the coordination request information is transmitted in the broadcast or multicast manner, the coordination request information includes the coordinating UE list, so that the other UEs first determine whether the UE is in the coordinating UE list after receiving the coordination request information, thereby determining whether the UE is a valid coordinating UE, and if the UE is a valid coordinating UE, the UE may further transmit a coordination information signaling to the coordinated UE.

It should be noted that, in this optional embodiment, on one hand, the indication information of the coordinating UE may be configured by a higher layer; on the other hand, the UE included in the indication information of the coordinated UE is a list of coordinated UEs expected by the coordinated UE, that is: the coordinated UEs desire to establish a list of UEs cooperating among the UEs.

Figure 7:
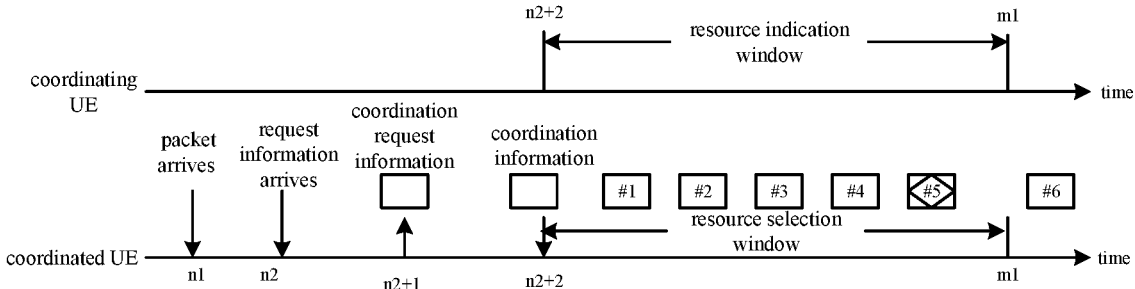
FIG. 7 is a second timing diagram of cooperative interaction between UEs according to an embodiment of the present disclosure.

The following describes an interaction procedure of the cooperation mechanism between UEs with reference to the specific example of FIG. 7:

Step 1: determining the content of the sidelink resource coordination request information:

the sidelink resource coordination request information includes the following contents:

transmission parameters of the coordinated UE, where the number of occupied sub-channels is 2, and the RSRP threshold is—75 dBm;

the type of the coordination information expected to be fed back is available time-frequency resource;

the end time of the current window of the coordination information is m1;

the maximum time delay of the coordinated information feedback is 3 ms;

Step 2: transmitting coordination request information according to predefined time delay (1 ms);

as shown in FIG. 7, at time n2, the sidelink resource coordination request information reaches the physical layer, and then the transmission resource is selected for the sidelink resource coordination request information according to the sensing result. Since the latency is 1 ms, the selected resource cannot exceed n2+1. As shown in FIG. 7, the finally selected resource is at time n2+1.

Step 3: after the coordinating UE receives the sidelink resource coordination request information, the coordinating UE determines coordination information;

as shown in FIG. 7, regardless of the transmission delay, the coordinating UE receives the sidelink resource coordination request information at time n2+1. Considering the processing time delay (assumed to be 1 ms), as shown in FIG. 7, the earliest time for coordinating the coordination information included in the UE is n2+2, and the available time-frequency resource determined according to the sensing result and the RSRP threshold in the sidelink resource coordination request information are #1, #2, #3, #4, #6 (these resource all occupy two sub-channels). Since the coordination information target resource selection window included in the request signaling includes only the end time m1, the available resource #6 need not be included in the coordination information. The start time n2+2 of the coordination information window needs to be included in addition to the available resource information.

Step 3: transmitting the coordination information.

Since the maximum time delay of the coordinated information feedback included in the sidelink resource coordination request information is 3 ms, the time for transmitting the sidelink resource coordination information cannot exceed n2+3. As shown in FIG. 7, the time for transmitting the coordination information is n2+2, regardless of the transmission delay.

Step 4: coordinating UE to determining a resource selection window and performing a resource exclusion and a resource selection;

the coordinating UE determines a resource selection window [n2+3, m1] according to the received coordination information with a start time of n2+2. Then, the resource #1, #2, #3, #4, #5 (which occupy two sub-channels) are determined as available resource according to the self-sensed result. And (4) taking the intersection of the available time-frequency resource sensed by the coordination information and the self information, and finally determining the resource #1, #2, #3 and

4 as the available resource. And then randomly selects a resource required for transmission from the available resource.

According to the resource selection method in the embodiment of the present disclosure, the content of the coordination request information is designed, so that the content of the coordination request information is more complete, and the following problems can be avoided: the available resource sensed by the coordinated UE is inappropriate due to hidden node and half-duplex, so that the receiving UE cannot correctly decode the received packet, the overhead of the coordination request information is high, and the container of the coordination request information is uncertain. In addition, the coordinating UE selects resource according to the content in the coordination request information, thereby realizing the time limitation of the coordination information, avoiding the transmission of unnecessary coordination information, reducing the overhead of the coordination information and improving the timeliness of the coordination information.

Figure 8:
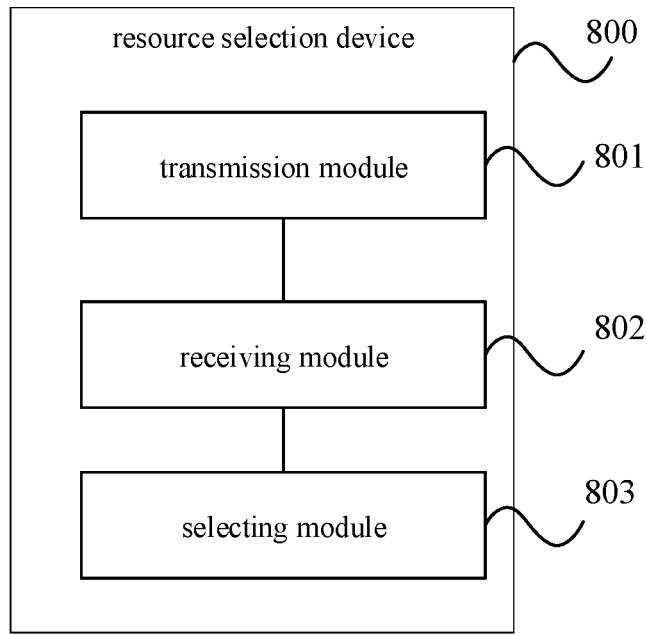
FIG. 8 is a schematic view of a resource selection device according to an embodiment of the present disclosure.

As shown in FIG. 8, an embodiment of the present disclosure further provides a resource selection device, which is applied to a coordinated UE of a V2X sidelink, and includes:

a transmission module 801, configured to transmit sidelink resource coordination request information;

a receiving module 802, configured to receive sidelink resource coordination information from a coordinating UE; and a selecting module 803, configured to select a resource for the sidelink according to the sidelink resource coordination information.

According to the embodiments of the present disclosure, when a coordinated UE of a V2X sidelink system selects resource, the transmission module 801 firstly transmits sidelink resource coordination request information, then the receiving module 802 receives sidelink resource coordination information transmitted by a coordinating UE, and finally the selecting module 803 selects the resource of the sidelink according to the sidelink resource coordination information. Therefore, on one hand, the overhead of the sidelink resource coordination request information is determined, so as to determine conveniently a container of the sidelink resource coordination request information; on the other hand, the timeliness of the sidelink resource coordination information determined by the coordinating UE according to the sidelink resource coordination request information is better, thereby avoiding the large signaling overhead of the sidelink resource coordination information due to the unnecessary transmission of the sidelink resource coordination information.

Optionally, the sidelink resource coordination request information includes at least one of:

indication information of coordinating information type;

indication information of a maximum time delay of coordinating information feedback;

indication information of a target resource selection window of resource coordination;

a transmission parameter of packet of the coordinated UE;

Reference Signal Receiving Power (RSRP) threshold indication information;

indication information of coordinating information transmission parameter; or indication information of the coordinating UE.

Optionally, the transmission parameter of packet of the coordinated UE include at least one of:

a number of sub-channels occupied by a packet to be transmitted by the coordinated UE;

a number of times of retransmission of a packet to be transmitted by the coordinated UE;

a transmission period of a packet to be transmitted by the coordinated UE;

a current Counter value of a packet to be transmitted by the coordinated UE;

a priority of a packet to be transmitted by the coordinated UE; or a target resource selection window parameter of the coordinated UE.

Optionally, the indication information of coordinating information type includes:

an available time-frequency resource; or an available time-domain resource; or an unavailable time-frequency resource; or an unavailable time-domain resource.

Optionally, the indication information of the maximum time delay of coordinating information feedback includes one of:

a time delay threshold, configured to indicate a maximum time delay between receiving the sidelink resource coordination information and transmitting the sidelink resource coordination request information;

a first offset time, configured to indicate an offset between a time of transmitting the sidelink resource coordination request information and a time when the packet to be transmitted arrives a physical layer of the coordinated UE.

Optionally, the indication information of the target resource selection window of resource coordination includes any one of:

a start time and an end time of a target resource selection window of the coordinated UE;

an end time of a target resource selection window of the coordinated UE.

Optionally, when the indication information of the target resource selection window of resource coordination includes the end time of the target resource selection window of the coordinated UE, the received coordination information of sidelink includes a start time of a resource selection window sensed by the coordinating UE.

Optionally, the performing the resource selection for the sidelink according to the sidelink resource coordination information includes:

determining a resource selection window of the coordinated UE, where the resource selection window of the coordinated UE is at least part of a resource indication window contained in the sidelink resource coordination information; and performing the resource selection for the sidelink in the resource selection window of the coordinated UE.

Optionally, the indication information of coordinating information transmission parameter includes any one of:

a transmission period; or a transmission period and a number of times of transmission.

Optionally, the indication information of coordinating information transmission parameter is configured by a higher layer or preconfigured; or when a traffic of the coordinated UE is a periodic traffic, the transmission period is a transmission period of a packet to be transmitted by the coordinated UE, and the number of times of transmission is a current Counter value of a packet to be transmitted by the coordinated UE.

Optionally, the RSRP threshold indication information includes any of:

a maximum value of RSRP threshold;

a maximum value of adjusting times of RSRP threshold.

Optionally, the transmitting the sidelink resource coordination request information includes:

determining a maximum time delay of transmitting the sidelink resource coordination request information, where the maximum time delay of transmitting the sidelink resource coordination request information is configured by a higher layer or preconfigured, or is determined according to a determined maximum time delay between a time of receiving the sidelink resource coordination information and a time when a packet to be transmitted arrives a physical layer of the coordinated UE;

transmitting the sidelink resource coordination request information within the determined maximum time delay of transmitting the sidelink resource coordination request information.

Optionally, a priority of the sidelink resource coordination request information is one of:

a priority of a packet to be transmitted;

a priority configured by a higher layer or preconfigured; or a preset priority, where the preset priority is a larger one of a first difference and 0, the first difference is a difference between a priority of a packet to be transmitted and a preset value, and the preset value is configured by a higher layer.

Optionally, the sidelink resource coordination request information is carried in one of:

second stage sidelink control information (2nd-stage SCI);

a radio resource control (RRC) signaling;

a media access control control unit (MAC CE).

Optionally, when the 2nd-stage SCI carries the sidelink resource coordination request information, a bit in a first stage sidelink control information (1st-stage SCI) for indicating a format of the 2nd-stage SCI is "10" or "11".

Optionally, the indication information of the coordinating UE includes identification information of one or more target coordinating UEs.

According to the resource selection device in the embodiment of the present disclosure, the content of the coordination request information transmitted by the transmission module 801 is designed, so that the content of the coordination request information is more complete, and the following problems can be avoided: the available resource sensed by the coordinating UE is inappropriate due to hidden node and half-duplex, so that the receiving UE cannot correctly decode the received packet, the overhead of the coordination request information is high, and the container of the coordination request information is uncertain. In addition, the coordinating UE selects resource according to the content in the coordination request information, thereby realizing the time limitation of the coordination information, avoiding the transmission of unnecessary coordination information, reducing the overhead of the coordination information and improving the timeliness of the coordination information.

The resource selection device 800 in the embodiment of the present disclosure is an apparatus corresponding to the above method embodiment, and all implementation means in the above method embodiment are applicable to the embodiment of the apparatus, and can achieve the same technical effect. To avoid repetition, it is not described here in detail.

Figure 9:
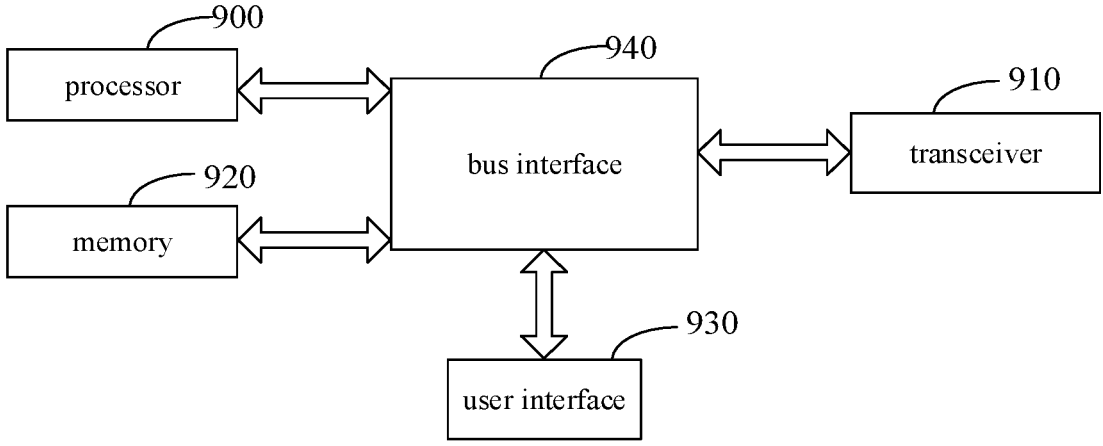
FIG. 9 is a schematic view of a terminal device according to an embodiment of the present disclosure.

As shown in FIG. 9, an embodiment of the present disclosure further provides an electronic device, including: a processor 900; and a memory 920 connected to the processor 900 through a bus interface, the memory 920 being used to store programs and data used by the processor 900 when performing operations, the processor 900 calling and executing the programs and data stored in the memory 920.

Among them, the transceiver 910 is connected with bus interface, is used for receiving and transmitting the data under the control of the processor 900; the processor 900 is configured to read the program in the memory 920 to execute the following steps:

the transceiver 910 transmitting sidelink resource coordination request information;

the transceiver 910 receiving sidelink resource coordination information from a coordinating UE;

performing a resource selection for the sidelink, according to the sidelink resource coordination information.

In FIG. 9, the bus architecture may include any number of interconnected buses and bridges, with one or more processors, represented by the processor 900, and various circuits, represented by the memory 920, being linked together. The bus architecture may also link together various other circuits such as peripherals, voltage regulators, power management circuits, and the like, which are well known in the art, and therefore, will not be described any further herein. The bus interface provides an interface. The transceiver 910 may be a plurality of elements, including a transmitter and a transceiver, providing a means for communicating with various other apparatus over a transmission medium. For different terminals, the user interface 930 may also be an interface capable of interfacing with a expected device, including but not limited to a keypad, display, speaker, microphone, joystick, etc. The processor 900 is responsible for managing the bus architecture and general processing, and the memory 920 may store data used by the processor 900 in performing operations.

Optionally, the sidelink resource coordination request information transmitted by the control transceiver 910 includes at least one of:

indication information of coordinating information type;

indication information of a maximum time delay of coordinating information feedback;

indication information of a target resource selection window of resource coordination;

a transmission parameter of packet of the coordinated UE;

Reference Signal Receiving Power (RSRP) threshold indication information;

indication information of coordinating information transmission parameter; or indication information of the coordinating UE.

Optionally, the transmission parameter of packet of the coordinated UE in the sidelink resource coordination request information transmitted by the control transceiver 910 include at least one of:

a number of sub-channels occupied by a packet to be transmitted by the coordinated UE;

a number of times of retransmission of a packet to be transmitted by the coordinated UE;

a transmission period of a packet to be transmitted by the coordinated UE;

a current Counter value of a packet to be transmitted by the coordinated UE;

a priority of a packet to be transmitted by the coordinated UE; or a target resource selection window parameter of the coordinated UE.

Optionally, the indication information of coordinating information type in the sidelink resource coordination request information transmitted by the control transceiver 910 includes:

an available time-frequency resource; or an available time-domain resource; or an unavailable time-frequency resource; or an unavailable time-domain resource.

Optionally, the indication information of the maximum time delay of coordinating information feedback in the sidelink resource coordination request information transmitted by the control transceiver 910 includes one of:

a time delay threshold, configured to indicate a maximum time delay between receiving the sidelink resource coordination information and transmitting the sidelink resource coordination request information;

a first offset time, configured to indicate an offset between a time of transmitting the sidelink resource coordination request information and a time when the packet to be transmitted arrives a physical layer of the coordinated UE.

Optionally, the indication information of the target resource selection window of resource coordination in the sidelink resource coordination request information transmitted by the control transceiver 910 includes any one of:

a start time and an end time of a target resource selection window of the coordinated UE;

an end time of a target resource selection window of the coordinated UE.

Optionally, when the indication information of the target resource selection window of resource coordination in the sidelink resource coordination request information transmitted by the control transceiver 910 includes the end time of the target resource selection window of the coordinated UE, the received coordination information of sidelink includes a start time of a resource selection window sensed by the coordinating UE.

Optionally, the processor 900, when performing the resource selection for the sidelink according to the sidelink resource coordination information, is configured to perform:

determining a resource selection window of the coordinated UE, where the resource selection window of the coordinated UE is at least part of a resource indication window contained in the sidelink resource coordination information; and performing the resource selection for the sidelink in the resource selection window of the coordinated UE.

Optionally, the indication information of coordinating information transmission parameter in the sidelink resource coordination request information transmitted by the control transceiver 910 includes any one of:

a transmission period; or a transmission period and a number of times of transmission.

Optionally, the indication information of coordinating information transmission parameter in the sidelink resource coordination request information transmitted by the control transceiver 910 is configured by a higher layer or preconfigured; or when a traffic of the coordinated UE is a periodic traffic, the transmission period is a transmission period of a packet to be transmitted by the coordinated UE, and the number of times of transmission is a current Counter value of a packet to be transmitted by the coordinated UE.

Optionally, the RSRP threshold indication information in the sidelink resource coordination request information transmitted by the control transceiver 910 includes any of:

a maximum value of RSRP threshold;

a maximum value of adjusting times of RSRP threshold.

Optionally, the transceiver 910, when transmitting the sidelink resource coordination request information, is configured to perform:

determining a maximum time delay of transmitting the sidelink resource coordination request information, where the maximum time delay of transmitting the sidelink resource coordination request information is configured by a higher layer or preconfigured, or is determined according to a determined maximum time delay between a time of receiving the sidelink resource coordination information and a time when a packet to be transmitted arrives a physical layer of the coordinated UE;

transmitting the sidelink resource coordination request information within the determined maximum time delay of transmitting the sidelink resource coordination request information.

Optionally, a priority of the sidelink resource coordination request information in the sidelink resource coordination request information transmitted by the control transceiver 910 is one of:

a priority of a packet to be transmitted;

a priority configured by a higher layer or preconfigured; or a preset priority, where the preset priority is a larger one of a first difference and 0, the first difference is a difference between a priority of a packet to be transmitted and a preset value, and the preset value is configured by a higher layer.

Optionally, the sidelink resource coordination request information transmitted by the control transceiver 910 is carried in one of:

second stage sidelink control information (2nd-stage SCI);

a radio resource control (RRC) signaling;

a media access control control unit (MAC CE).

Optionally, when the 2nd-stage SCI carries the sidelink resource coordination request information, a bit in a first stage sidelink control information (1st-stage SCI) for indicating a format of the 2nd-stage SCI is "10" or "11".

Optionally, the indication information of the coordinating UE in the sidelink resource coordination request information transmitted by the control transceiver 910 includes identification information of one or more target coordinating UEs.

The embodiment of the present disclosure is corresponding to the above method embodiment, and all implementation means in the above method embodiment are applicable to the embodiment of the terminal, and can achieve the same technical effect.

Those skilled in the art will understand that all or part of the steps for implementing the above embodiments may be implemented by hardware, or may be implemented by a computer program instructing relevant hardware, where the computer program includes instructions for executing all or part of the steps of the above methods; and the computer program may be stored in a readable storage medium, which may be any form of storage medium. That is, the embodiments of the present disclosure also provide a computer-readable storage medium, on which a computer program is stored, which when executed by a processor implements the steps of the resource selection method as described above.

Further, it is noted that in the apparatus and method of the present disclosure, it is apparent that each component or each step may be decomposed and/or recombined. Such decomposition and/or recombination should be considered as equivalents of the present disclosure. Also, the steps of performing the series of processes described above may naturally be performed chronologically in the order described, but need not necessarily be performed chronologically, and some steps may be performed in parallel or independently of each other. It will be understood by those of ordinary skill in the art that all or any of the steps or elements of the methods and apparatus of the present disclosure may be implemented in any computing device (including processors, storage media, etc.) or network of computing devices, in hardware, firmware, software, or any combination thereof, which may be implemented by those of ordinary skill in the art using their basic programming skills after reading the description of the present disclosure.

Thus, the objects of the present disclosure may also be achieved by running a program or a set of programs on any computing device. The computing device may be a well-known general purpose device. Thus, the objects of the present disclosure can also be achieved merely by providing a program product containing program code for implementing the method or apparatus. That is, such a program product also constitutes the present disclosure, and a storage medium storing such a program product also constitutes the present disclosure. It is to be understood that such storage media can be any known storage media or any storage media developed in the future. It is also noted that in the apparatus and methods of the present disclosure, it is apparent that the components or steps may be broken down and/or re-combined. Such decomposition and/or recombination should be considered as equivalents of the present disclosure. Also, the steps of executing the series of processes described above may naturally be executed chronologically in the order described, but need not necessarily be executed chronologically. Some steps may be performed in parallel or independently of each other.

While the foregoing is directed to the preferred embodiment of the present disclosure, it will be appreciated that various modifications and adaptations may be made by those skilled in the art without departing from the principles of the disclosure and should be considered as within the scope of the disclosure.

What is claimed is:

1. A resource selection method, performed by a coordinated user equipment (UE) of a Vehicle to everything (V2X) sidelink system and comprising:

transmitting, to a coordinating UE, sidelink resource coordination request information for requesting the coordinating UE to coordinate resources of a sidelink between the coordinated UE and the coordinating UE;

receiving sidelink resource coordination information from the coordinating UE; and performing a resource selection for the sidelink, according to the sidelink resource coordination information;

wherein the sidelink resource coordination request information is carried in second stage sidelink control information (2nd-stage SCI), and a bit in a first stage sidelink control information (1st-stage SCI) for indicating a format of the 2nd-stage SCI is "10" or "11".

2. The method according to claim 1, wherein the sidelink resource coordination request information comprises at least one of:

indication information of a maximum time delay of coordinating information feedback;

Reference Signal Receiving Power (RSRP) threshold indication information;

indication information of coordinating information transmission parameter; or indication information of the coordinating UE.

3. The method according to claim 1, wherein the transmission parameter of packet of the coordinated UE comprises at least one of:

a number of sub-channels occupied by a packet to be transmitted by the coordinated UE;

a number of times of retransmission of a packet to be transmitted by the coordinated UE;

a transmission period of a packet to be transmitted by the coordinated UE;

a current Counter value of a packet to be transmitted by the coordinated UE;

a priority of a packet to be transmitted by the coordinated UE; or a target resource selection window parameter of the coordinated UE.

4. The method according to claim 2, wherein the indication information of coordinating information type comprises:

an available time-frequency resource; or an available time-domain resource; or an unavailable time-frequency resource; or an unavailable time-domain resource.

5. The method according to claim 2, wherein the indication information of the maximum time delay of coordinating information feedback comprises one of:

a time delay threshold, configured to indicate a maximum time delay between receiving the sidelink resource coordination information and transmitting the sidelink resource coordination request information;

a first offset time, configured to indicate an offset between a time of transmitting the sidelink resource coordination request information and a time when the packet to be transmitted arrives a physical layer of the coordinated UE.

6. The method according to claim 1, wherein the indication information of the target resource selection window of resource coordination comprises any one of:

a start time and an end time of a target resource selection window of the coordinated UE;

an end time of a target resource selection window of the coordinated UE.

7. The method according to claim 6, wherein when the indication information of the target resource selection window of resource coordination includes the end time of the target resource selection window of the coordinated UE, the received coordination information of sidelink comprises a start time of a resource selection window sensed by the coordinating UE.

8. The method according to claim 1, wherein the performing the resource selection for the sidelink according to the sidelink resource coordination information comprises:

determining a resource selection window of the coordinated UE, wherein the resource selection window of the coordinated UE is at least part of a resource indication window contained in the sidelink resource coordination information; and performing the resource selection for the sidelink in the resource selection window of the coordinated UE.

9. The method according to claim 2, wherein the indication information of coordinating information transmission parameter comprises any one of:

a transmission period; or a transmission period and a number of times of transmission.

10. The method according to claim 9, wherein the indication information of coordinating information transmission parameter is configured by a higher layer or preconfigured; or when a traffic of the coordinated UE is a periodic traffic, the transmission period is a transmission period of a packet to be transmitted by the coordinated UE, and the number of times of transmission is a current Counter value of a packet to be transmitted by the coordinated UE.

11. The method according to claim 2, wherein the RSRP threshold indication information comprises any of:

a maximum value of RSRP threshold;

a maximum value of adjusting times of RSRP threshold.

12. The method according to claim 1, wherein the transmitting, to the coordinating UE, the sidelink resource coordination request information comprises:

determining a maximum time delay of transmitting the sidelink resource coordination request information, wherein the maximum time delay of transmitting the sidelink resource coordination request information is configured by a higher layer or preconfigured, or the maximum time delay of transmitting the sidelink resource coordination request information is determined according to a determined maximum time delay between a time of receiving the sidelink resource coordination information and a time when a packet to be transmitted arrives a physical layer of the coordinated UE; and/or transmitting the sidelink resource coordination request information within the determined maximum time delay of transmitting the sidelink resource coordination request information.

13. The method according to claim 1, wherein a priority of the sidelink resource coordination request information is one of:

a priority of a packet to be transmitted;

a priority configured by a higher layer or preconfigured; or a preset priority, wherein the preset priority is a larger one of a first difference and 0, the first difference is a difference between a priority of a packet to be transmitted and a preset value, and the preset value is configured by a higher layer.

14. The method according to claim 2, wherein when the sidelink resource coordination request information further comprises the indication information of the coordinating UE, the indication information of the coordinating UE comprises identification information of one or more target coordinating UEs.

15. A terminal device, the terminal device being a coordinated UE and comprising: a transceiver, a memory, a processor and a computer program stored on the memory and executable on the processor, wherein the processor is configured to execute the computer program to perform:

transmitting, to a coordinating UE, sidelink resource coordination request information for requesting the coordinating UE to coordinate resources of a sidelink between the coordinated UE and the coordinating UE;

receiving sidelink resource coordination information from the coordinating UE; and performing a resource selection for the sidelink, according to the sidelink resource coordination information;

wherein the sidelink resource coordination request information is carried in second stage sidelink control information (2nd-stage SCI), and a bit in a first stage sidelink control information (1st-stage SCI) for indicating a format of the 2nd-stage SCI is "10" or "11".

16. The terminal device according to claim 15, wherein the sidelink resource coordination request information comprises at least one of:

indication information of coordinating information type;

indication information of a maximum time delay of coordinating information feedback;

indication information of a target resource selection window of resource coordination;

a transmission parameter of packet of the coordinated UE;

Reference Signal Receiving Power (RSRP) threshold indication information;

indication information of coordinating information transmission parameter; or indication information of the coordinating UE.

17. The terminal device according to claim 16, wherein the transmission parameter of packet of the coordinated UE comprises at least one of:

a number of sub-channels occupied by a packet to be transmitted by the coordinated UE;

a number of times of retransmission of a packet to be transmitted by the coordinated UE;

a transmission period of a packet to be transmitted by the coordinated UE;

a current Counter value of a packet to be transmitted by the coordinated UE;

a priority of a packet to be transmitted by the coordinated UE; or a target resource selection window parameter of the coordinated UE.

18. The terminal device according to claim 15, wherein the indication information of the target resource selection window of resource coordination comprises any one of:

a start time and an end time of a target resource selection window of the coordinated UE;

an end time of a target resource selection window of the coordinated UE.

19. The terminal device according to claim 18, wherein when the indication information of the target resource selection window of resource coordination includes the end time of the target resource selection window of the coordinated UE, the received coordination information of sidelink comprises a start time of a resource selection window sensed by the coordinating UE.

20. The terminal device according to claim 15, wherein a priority of the sidelink resource coordination request information is one of:

a priority of a packet to be transmitted;

a priority configured by a higher layer or preconfigured; or a preset priority, wherein the preset priority is a larger one of a first difference and 0, the first difference is a difference between a priority of a packet to be transmitted and a preset value, and the preset value is configured by a higher layer.

\* \* \* \* \*